United States Patent [19]

Yoshikawa et al.

[11] 3,927,190

[45] Dec. 16, 1975

[54] METHOD FOR PRODUCING ANHYDROUS HYDROSULFITE

[75] Inventors: Yoshio Yoshikawa, Ushiku; Akitoshi Sugio; Tomotake Kato, both of Tokyo; Heizo Okazaki, Osaka, all of Japan

[73] Assignee: Mitsubishi Gas Chemical Company, Inc., Tokyo, Japan

[22] Filed: July 12, 1974

[21] Appl. No.: 487,573

Related U.S. Application Data

[63] Continuation-in-part of Ser. No. 429,685, Dec. 28, 1973, abandoned, which is a continuation of Ser. No. 201,319, Nov. 23, 1971, abandoned, which is a continuation-in-part of Ser. No. 637,062, May 9, 1967, abandoned.

[30] Foreign Application Priority Data

| May 16, 1966 | Japan | 41-30689 |
| May 16, 1966 | Japan | 41-30690 |
| Nov. 17, 1966 | Japan | 41-75237 |

[52] U.S. Cl. ................................................ 423/515
[51] Int. Cl.² .......................................... C01B 17/66
[58] Field of Search .................... 423/512, 515, 516

[56] References Cited

UNITED STATES PATENTS

| 2,010,615 | 8/1935 | Vanderbilt et al. ............... 423/515 |
| 3,411,875 | 11/1968 | Yoshihawa et al. ............... 423/515 |

*Primary Examiner*—Earl C. Thomas
*Attorney, Agent, or Firm*—Fitzpatrick, Cella, Harper & Scinto

[57] ABSTRACT

Anhydrous alkali metal hydrosulfite is prepared by adding an aqueous solution of an alkali-metal compound and an alcoholic solution of sulfur dioxide to an alcohol-water solution or suspension of an alkali-metal formate at a temperature of 75° to 90°C, and subsequently maintaining this temperature until the reaction is substantially complete.

2 Claims, No Drawings

METHOD FOR PRODUCING ANHYDROUS HYDROSULFITE

This is a continuation-in-part of a copending application, Ser. No. 429,685 filed on Dec. 28, 1973, which, in turn, is a continuation of Ser. No. 201,319, filed Nov. 23, 1971, now abandoned, which, in turn, is a continuation-in-part of Ser. No. 637,062 filed May 9, 1967, now abandoned.

The present invention relates to a method for producing an anhydrous alkali metal hydrosulfite.

The method of the present invention is an improvement on the method described in the commonly assigned U.S. Pat. No. 3,411,875, which describes the preparation of an anhydrous alkali-metal hydrosulfite by adding dropwise a methanol solution of sulfur dioxide and an aqueous solution of an alkali-metal compound to an aqueous solution of an alkali metal formate at a temperature around 75°C. It has been found that increased purity, stability, and yield are obtained by carrying out the reaction at a considerably elevated temperature and pressure, particularly when the alkali metal formate is initially present in the form of an alcohol-water solution or suspension.

In accordance with the present invention, the reaction temperature is initially maintained at least at 75°C. After the sulfur dioxide addition and the alkali metal compound addition are complete, the reaction temperature is raised up to 80°–90°C, preferably from 80°–88°C.

The produced hydrosulfite is readily precipitated from sulfites, alkali formates, or other substances which may be contained in the alcohol-water system as impurities, because the solubilities of these impurities are larger than those of hydrosulfites. Consequently, a product of high purity can be directly obtained from the reaction solution, and the major part of the impurities remains in solution.

The process of this invention is illustrated by the following reaction formulae, wherein the alkali metal compound is sodium hydroxide and the alkali metal formate is sodium formate.

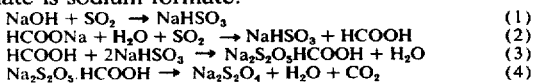

The formic acid produced in reaction (2) and the sodium bisulfite produced in reaction (1) and (2) are turned into the complex compound of sodium pyrosulfite and formic acid which is easily decomposed to produce sodium hydrosulfite.

Since the sodium bisulfite and formic acid consumed in the reaction (3) are derived from the sodium hydroxide and sulfur dioxide, the rate of addition of the latter should correspond to the rate of production of the hydrosulfite. If the rate of addition is too fast, the respective concentrations of sulfur dioxide and formic acid become excessive, and cause decomposition of the hydrosulfite, with proportionate reduction in the final yield. The reason for this is that alkali metal hydrosulfites are generally unstable in acidic solutions. Moreover, the excess bisulfite produced precipitates together with the hydrosulfite, adversely affecting purity and yield of the latter.

Super-atmospheric pressure is preferred. This may be accomplished by controlling the rate of discharge of carbon dioxide gas from the reaction vessel as it is produced in the reaction. Alternatively, an inactive gas can be fed into the reaction vessel. It is preferable to maintain the reaction pressure below 10 kg/cm² gauge, more preferably, below 5 kg/cm² gauge, but at super-atmospheric pressure.

During the reaction, formic acid ester or esters are formed by the alcohol or alcohols present and free formic acid. Generally speaking, formic acid esters are low boiling, and tend to be lost from the reaction mixture, whereby the concentrations of alkali metal formate and alcohol are reduced. By recovering the boiled-off formic and ester and recycling it to the reaction mixture, it is possible to improve the yield of the desired product. The reason for this is that the recycled ester is hydrolyzed to formic acid and the corresponding alcohol.

The addition of sulfur dioxide and the alkali metal compound will generally require about 30 minutes to 3 hours to give the best results.

Addition of the sulfur dioxide solution and the alkali metal compound solution may be effected in a dropwise manner, or in the form of a continuous or intermittent stream, provided the amount added in any given interval is not too great.

The alkali metal compound used in this invention may be an alkali metal hydroxide, carbonate or sulfite. Sodium hydroxide is the preferred compound. The alkali metal compound is preferably added to the reaction solution in the form of an aqueous solution. A water-alcohol solution is also contemplated.

The alcohols used in this invention include methanol, ethanol, and mixtures thereof. Methanol is preferred, because of the relatively greater solubilities of the substances in the reaction system in this alcohol.

In accordance with the method of the present invention, alkali metal hydrosulfite having a purity greater than 93% is obtained. Provided the reaction temperature is maintained at 90°C or less, the thiosulfate produced by the decomposition of the hydrosulfite is less than 2% of the produced hydrosulfite.

The preferred proportions of the raw materials (exemplified with sodium formate and sodium hydroxide) are 100 parts of sulfur dioxide, 70 to 90 parts sodium formate, 26 to 34 parts of sodium hydroxide, 70 to 120 parts of water and 370 to 450 parts of the alcohol. Sulfur dioxide is typically used as a 22–26% alcoholic solution; and sodium hydroxide, as a 35–50% aqueous solution.

Less than 7% of a formic acid ester or esters and a small amount of water may be added to the sulfur dioxide solution.

The alkali metal formate alcohol-water solution or suspension may contain 25 to 40% water.

EXAMPLE 1

80 parts of sodium formate (purity 97%) was dissolved in 60 parts of hot water, and 120 parts of methanol was added thereto. The resulting slurry was charged into a reaction vessel made of stainless steel, and provided with a thermometer, stainless steel reflux condenser, a cold trap for collecting low boiling point substances, a separatory funnel and a heating jacket.

The reaction system was pressurized to 0.5 kg/cm² gauge by means of an inert gas in the beginning, and the slurry was heated up to 76°C. A solution of 100 parts of sulfur dioxide in 305 parts methanol and a solution of 30 parts sodium hydroxide in 35 parts water were simultaneously added, dropwise, to the said slurry over a period of 60 minutes, while stirring the reaction mixture.

The produced carbon dioxide gas was discharged from the system at a rate sufficient to maintain the pressure at 0.5 kg/cm² gauge. The methanol solution of sulfur dioxide was added at a constant rate; whereas the first 30% of the sodium hydroxide solution was added at a rate 2 to 2.5 times greater than the remainder.

After these additions the reaction pressure was increased to 1.0 kg/cm² gauge, the reaction temperature raised to from 82°C to 83°C, and the reaction mixture was stirred for another 2.5 hours.

The produced anhydrous hydrosulfite precipitate was filtered from the reaction mixture under a carbon dioxide atmosphere to prevent contact with air. The collected precipitate was washed with 100 parts of methanol, and then dried at a temperature ranging from 75°C to 85°C under reduced pressure for 1.5 hours. The yield and purity of anhydrous sodium hydrosulfite were respectively 120 parts and 94.5%.

EXAMPLE 2

A solution of 100 parts of sulfur dioxide in 305 parts of methanol containing 2% of methyl formate, and a solution of 30 parts sodium hydroxide in 40 parts of water, were added, dropwise to a suspension of sodium formate obtained by adding 120 parts of methanol containing 2% of methyl formate to a solution of 80 parts of 97% sodium formate in 60 parts of hot water, in the same manner as in Example 1. Following the procedure of Example 1, a yield of 118 parts of anhydrous sodium hydrosulfite having a purity of 93.8% was obtained.

EXAMPLE 3

80 parts of sodium formate (purity 97%) was dissolved in 50 parts of hot water, and 120 parts of methanol was added thereto to produce a slurry, and the prepared slurry was charged into the same reaction vessel as was used in the Example 1. 30 parts of sodium hydroxide was dissolved into 40 parts of water, and half of this solution was added to the slurry. A solution of 100 parts of sulfur dioxide in 305 parts of methanol, and the remaining half of the sodium hydroxide solution were added uniformly to the reaction mixture at a temperature of 76°C under a pressure of 1 kg/cm² gauge over a period of 30 minutes. The reaction mixture was thereafter heated to 83°C, and the reaction continued at this temperature for 2.5 hours. After the reaction was completed, the procedure of Example 1 was carried out. The yield and purity of the obtained anhydrous sodium hydrosulfite were, respectively, 113 parts and 93.0%.

EXAMPLE 4

A slurry was prepared by adding 120 parts of methanol to a solution of 82 parts of sodium formate (purity 97%) dissolved in 55 parts of hot water. The slurry was charged into the same reaction vessel as was used in Example 1. Over a period of 2.5 hours a solution of 100 parts sulfur dioxide in 305 parts methanol, and a solution of 30 parts sodium hydroxide in 45 parts of water, were added to the slurry with stirring, under atmospheric pressure, at the boiling point of the reaction mixture.

After the completion of these additions, the reaction pressure was adjusted to be 2.0 kg/cm² gauge, and the reaction temperature was adjusted to be 82°C, and the reaction carried out for another two hours. Thereafter, the procedure of Example 1 was carried out. 109 parts of anhydrous sodium hydrosulfite having a purity of 93.1% was obtained.

EXAMPLE 5

82 parts of sodium formate (purity 95%) was dissolved in 45 parts of hot water, and 110 parts of ethanol added thereto, forming a slurry. The slurry was charged to the same reaction vessel as used in Example 1. The system pressure was adjusted to 1 kg/cm² gauge, and the slurry was heated to 80°C.

A solution of 100 parts sulfur dioxide in 300 parts methanol, and a solution of 30 parts sodium hydroxide in 45 parts of water, were added to the slurry over a period of 1.5 hours. During these additions, the reaction temperature was kept at 80°C. After the completion of the additions, the reaction was allowed to proceed for another 2.5 hours, while stirring the same; and then the procedure of Example 1 was carried out.

112 parts of anhydrous sodium hydrosulfite, having a purity of 93% was obtained.

COMPARATIVE EXAMPLE I 82 parts of sodium formate (purity 97%) were dissolved into 70 parts of hot water, and 120 parts of methanol containing 2% of methyl formate and 10% of propyl alcohol, were added thereto to prepare a slurry. A solution of 102 parts of sulfur dioxide in 305 parts of methanol containing 2% of methyl formate and 10% of propyl alcohol, and 62 parts of a 48.5 weight % aqueous of sodium hydroxide solution, were added to the slurry over a period of 2 hours. During the additions, the temperature of the reaction mixture was kept at 75°C to 76°C. After the completion of the addition, the reaction pressure was adjusted to be 1.0 kg/cm² gauge, the reaction temperature was adjusted to be 82°C, and the reaction was carried out for another 3 hours. Thereafter, the procedure of Example 1 was carried out.

108 parts of anhydrous sodium hydrosulfite, having a purity of 92.0% was obtained.

The present process, an improvement of U.S. Pat. No. 3,411,875 is carried out at super-atmospheric pressures and below about 10 kilograms per square centimeter gauge wherein the tmerpature of the reaction mixture is maintained at at least about 75°C initially.

The prior art does not teach the critical superatmospheric pressure range and temperature range of the present invention. U.S. Pat. No. 3,411,875 states that owing to the addition of all of the sulfur dioxide at the initial stage of the process disclosed in U.S. Pat. No. 2,010,615, the U.S. Pat. No. 2,010,615 crystals are fine and are of low stability. The U.S. Pat. No. 2,010,615, in Column 2, lines 20–23 and 30–32, teaches that the reaction temperature must be carefully controlled; and that overheating causes decomposition above about 76°C.

It has been contended that it would be obvious to utilize temperatures higher than disclosed in U.S. Pat. No. 3,111,875. Further it has been argued that the use of a temperature of above 75°C may not result in an improved product. A comparison has been made with (now) Comparative Example I (formerly Example 6) of the present application and Example 7 of Parent Application No. 637,062, now abandoned. The purity (92%) of the products produced is about the same. The reduction of purity of the product in Comparative Example I as compared to the other Examples herein is caused by the use of propyl alcohol.

It is seen in the Examples that where methanol or ethanol is employed as a carrier for sulfur dioxide, then the effect on the product employing temepratures higher than 75°C is very marked. Consider the results of Examples 1–5 of the present application. The reaction is completed in from 3 to 4½ hours. The yield ranges from 109 to 120 parts. The purity of the product is from 93 to 94.5%. In Example 1–3 of U.S. Pat. No. 3,411,875, the yield ranges from 35.6 to 37%, the purity ranges from 89 to 91.2% and the reaction time is from 4½ to 5 hours.

In Example 7 of the parent application, Ser. No. 637,062, the reaction time was 7½ hours yielding 105 parts of product in a purity of 92%. Experimentation has shown that where a temperature of 75°C is employed instead of 70°C in a process similar to that conducted in Example 7 of the parent application, then the reaction time will be about 4½ hours; the yield about 109 parts and the purity about 92.3%. Commercial process improvements on the order of from 8 to 9% in yield, 2 to 4% in purity and reductions of 3 hours in reaction time are of substantial importance. It is reasonable to assume that where advantageous effects of higher temperatures and pressures had been known, then they would have been disclosed, particularly in view of the economical importance of such effects. The absence of these indications in U.S. Pat. No. 3,411,875 can be attributed to a pre-existing prejudice against the use of high temperatures in view of U.S. Pat. No. 2,010,615.

Therefore we claim:

1. A method of producing an anhydrous alkali metal hydrosulfite from an alkali metal formate, and alkali metal compound and sulfur dioxide, which comprises:
   a. adding an aqueous solution of an alkali metal compound and a methanolic solution of sulfur dioxide to an alcohol-water solution or suspension of an alkali metal formate, said alcohol being selected from the group consisting of methanol and ethanol, said addition carried out at a temperature of at least about 75°C; and
   b. thereafter maintaining the temperature of the reaction mixture up to about 80° to 90°C to foster the reaction, wherein the pressure of the reaction system is super-atmospheric up to about 10 kilograms per square centimeter gauge.

2. A method of claim 1 in which the temperature of step (b) is from 80° to 88°C.

* * * * *